United States Patent [19]

Tsunazawa et al.

[11] 4,095,897
[45] Jun. 20, 1978

[54] WAVELENGTH DRIVING DEVICE FOR USE IN MONOCHROMATORS

[75] Inventors: Yoshio Tsunazawa; Masanao Nishida, both of Kyoto, Japan

[73] Assignee: Shimadzu Seisakusho Ltd., Kyoto, Japan

[21] Appl. No.: 726,838

[22] Filed: Sep. 27, 1976

[51] Int. Cl.² .............................................. G01J 3/14
[52] U.S. Cl. ................................................... 356/100
[58] Field of Search ................... 356/79, 100, 101; 350/162 R, 287

[56] References Cited

U.S. PATENT DOCUMENTS

| 2,587,451 | 2/1952 | Farrand | 356/101 |
| 3,822,941 | 7/1974 | Roche et al. | 356/100 |
| 4,003,657 | 1/1977 | Sovicka | 356/100 |

FOREIGN PATENT DOCUMENTS

| 931,478 | 7/1963 | United Kingdom | 356/100 |

Primary Examiner—John K. Corbin
Assistant Examiner—R. A. Rosenberger
Attorney, Agent, or Firm—Fidelman, Wolffe & Waldron

[57] ABSTRACT

A wavelength driving device for use in monochromators, wherein at least two wavelength driving cams of different peripheral contours are provided, which alternatively operate for different portions of the whole wavelength range to be covered by the device. The device is also provided with means which enables easy correction of deviations of dispersion of the prism from the design value.

13 Claims, 7 Drawing Figures

WAVELENGTH DRIVING DEVICE FOR USE IN MONOCHROMATORS

This invention relates to a wavelength driving device for use in monochromators, and more particularly to a wavelength driving device which drives a prism for dispersion of light from a source into different wavelengths.

Dispersion provided by prisms is so great in the ultraviolet region that a prism monochromator with a linear wavelength scale must have a prism driving cam the contour of which changes greatly in the ultraviolet region, with a resulting decrease in the accuracy and precision of wavelength selection. To overcome the difficulty a complicated spiral cam or a wavelength selection dial having unequally spaced scale marks has been employed, but these are difficult to manufacture or inconvenient in use.

Accordingly, the primary object of the invention is to provide a wavelength driving device for use in monochromators which has a linear wavelength scale over the whole wavelength range to be covered.

Another object of the invention is to provide such a wavelength driving device as aforesaid in a simple construction.

The device of the invention comprises a prism, a lever for rotating the prism about its axis, a plurality of wavelength cams and a plurality of corresponding cam follower rollers provided on the lever so that for a predetermined particular angle of rotation of the lever or the prism, that is, within a predetermined portion of the whole wavelength range, a particular one of the cam followers is in contact with a particular one of the cams.

In making prism monochromators it is often required to correct the deviations of dispersion from the design value which are caused by the difference in the apex angle of the prisms or the referative index of the material of the prisms. In the prior art monochromators such correction has been almost impossible after the wavelength driving mechanism has been assembled, or even if it was possible, the mechanism had to be reassembled from the first. This certainly is time-consuming and inconvenient.

Another object of the invention is, therefore, to provide a wavelength driving device for use in monochromators which is capable of easily correcting the deviations of dispersion of the prism from the design value which is caused by fluctuation of the apex angle of the prism or the refractive index of the prism material and at the same time enabling a wide change in the radius of the prism cam, with resulting improvements in the accuracy and precision of wavelength selection.

The invention with its above and other objects, features and advantages will become apparent from the following description of some preferred embodiments thereof with reference to the accompanying drawings, wherein.

Figure 1:
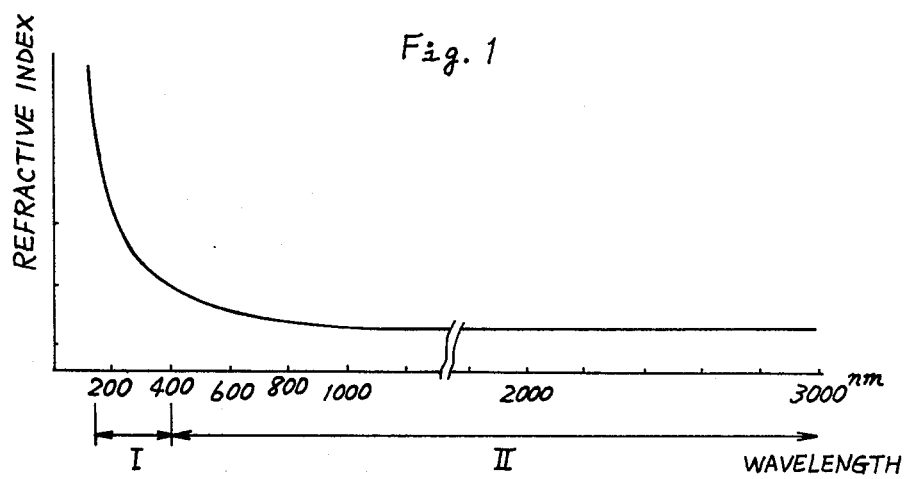
FIG. 1 is a graph showing the relation between the refractive index of a prism and wavelength.

Referring in detail to FIG. 1, there is graphycally shown a relation between the refractive index of a quartz prism and wavelength. As is clearly indicated by the curve, the refractive index changes greatly below 400 nm, s that the peripheral contour of the prism driving cam must change greatly in this wavelength region.

If two different cams are used for the two different wavelength regions I and II, one of them can be designed so as to make one revolution for the wavelength region I of from 180 to 400 nm, so that such a cam may have a peripheral contour less steep and varying than a cam which makes one revolution for the whole wavelength range of from 180 to 3000 nm would have in the range of from 180 to 400 nm. This invention is based on this idea.

Figure 2:
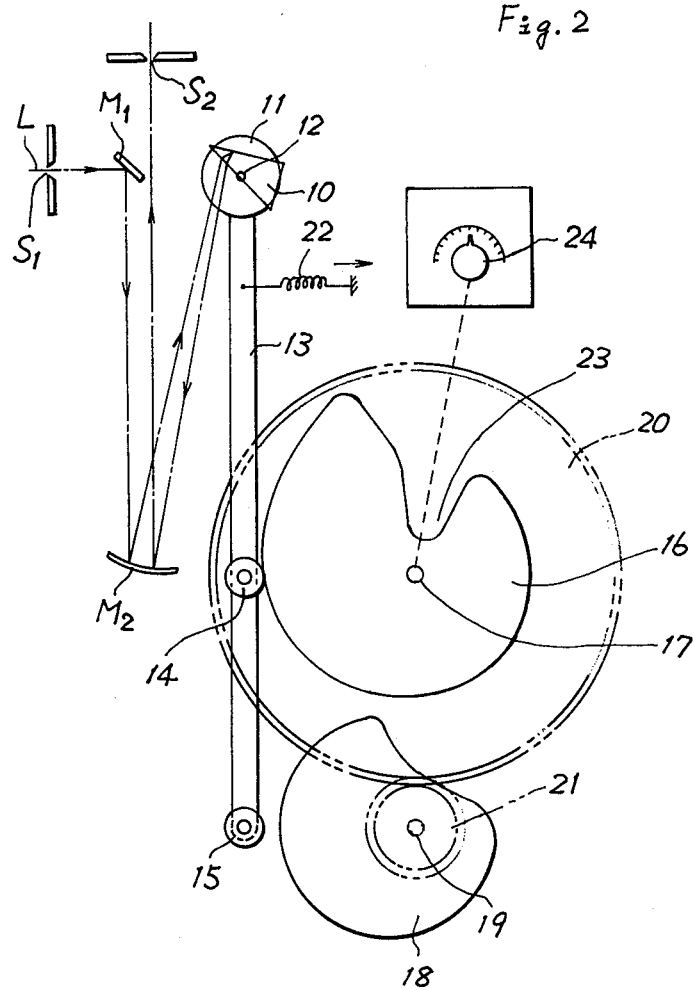
FIG. 2 is a somewhat schematic view of one embodiment of the invention.

One embodiment of the invention is shown in FIG. 2, wherein a prism 10 is fixed on a turntable 11 which is rotatable about an axis 12. A lever 13 is fixed to the table and has two cam follower rollers 14 and 15 spaced apart along the length thereof.

A first cam 16 is fixed to a rotatable shaft 17 and so contoured as to operate in the wavelength region of from 400 to 3000 nm, while a second cam 18 is fixed to a rotatable shaft 19 and so contoured as to operate in the wavelength region of from 180 to 400 nm.

Gears 20 and 21 are secured to the shafts 17 and 19, respectively, and mesh with each other. A dial 24 may be connected to the gear 20 for selection of wavelengths.

A spring 22 urges the lever 13 so that either one of the cam follower rollers 14 and 15 is in contact with the periphery of the corresponding cam 16 or 17. A recess 23 is formed in the periphery of the cam 16 for disengagement of the cam follower 14 from the cam 16 and simultaneous engagement of the cam follower 15 with the cam 18.

The light beam L from a suitable source not shown is passed through an inlet slit S1 to be reflected by a plain mirror M1 onto a collimating mirror M2, which makes the light rays parallel and directs them onto the prism 10. The prism disperses the light into different wavelengths, a selected one of which is focused by the mirror M2 onto an exit slit S2. The selection of a wavelength to be passed through the slit S2 is made by turning the prism about the axis 12 as is well known in the art.

The gear ratio of the two gears 20 and 21 is so predetermined that while the cam 16 makes one revolution for the whole wavelength range to be covered by the device, the cam 18 makes, say, 15 revolutions. The rotational ratio may not be proportional provided that when the cam follower 14 has reached the recess 23 so as to be disengaged from the cam 16, the other cam follower 15 is brought into contact with the cam 18. In the region of from 400 to 3000 nm the cam follower 15 is kept out of engagement with the cam 18, while in the region of from 180 to 400 nm in which the cam follower 14 is in the recess 23, the cam follower 15 is in contact with the cam 18.

Thus, in accordance with the invention, a cam is used for a portion of the whole wavelength range to be covered where change in the refractive index of the prism is extremely steep and a different cam is used for the remaining portion of the wavelength range where change in the refractive index is slower. This arrangement of the invention has eliminated the prior art necessity of having a single cam so contoured as to vary abruptly and greatly for the ultraviolet region and enabled wavelength driving with a high degree of accuracy and precision.

If rotation of the gear 20 is transmitted to a wavelength counter not shown through a suitable transmitting device, it is easily possible to provide a linear wavelength indication all over the whole wavelength range to be covered.

Figure 3:
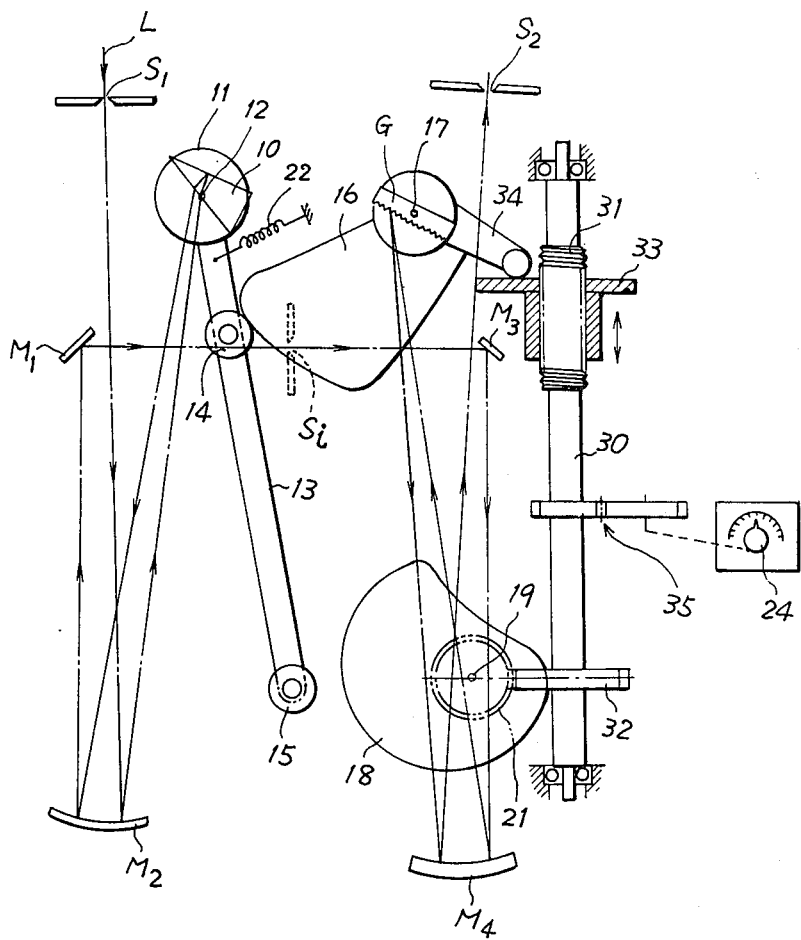
FIG. 3 is a somewhat schematic view of another embodiment of the invention.

FIG. 3 shows another embodiment of the invention suitable for use in a double-monochromator employing both a prism and a grating. The same reference numerals and symbols as in FIG. 1 denote corresponding parts or elements, which are arranged and operate in the same manner as in FIG. 1 so that no explanation of these elements will be necessary.

A shaft 30 has a threaded portion 31 formed thereon and a gear 32 fixed thereto. A nut 33 engages the threaded portion 31 so as to be moved axially of the shaft 30 as the shaft is rotated.

A lever 34 has its one end secured to the rotatable shaft 17 of the cam 16 and its other end abutting on the nut 33.

As the shaft 30 is rotated by means of the dial 24 through a suitable gearing 35, the nut 33 moves axially of the shaft 30 thereby to turn the lever 34, which in turn rotates the cam 16 and a grating G provided thereon about the axis of the shaft 17, and at the same time the gear 32 rotates the cam 18 through engagement with the gear 21.

As can be easily understood, the cam 16 operates within the wavelength region of 400–3000 nm while the cam 18 operates within the region of 180–400 nm, with the grating G always operating over the whole wavelength range. As is well known, the grating serves for finer selection of wavelengths of the light dispersed by the prism 10.

The light L entering through the inlet slit S1 is directed by a collimating mirror M2 to the prism 10. The dispersed light is again reflected by the collimating mirror M2 and then a plain mirror M1, through an intermediate slit Si, a plain mirror M3 and then a collimating mirror M4 to be projected onto the grating G to be finely dispersed. The dispersed light from the grating is again directed by the mirror M4 through an exit slit S2.

Figure 4:
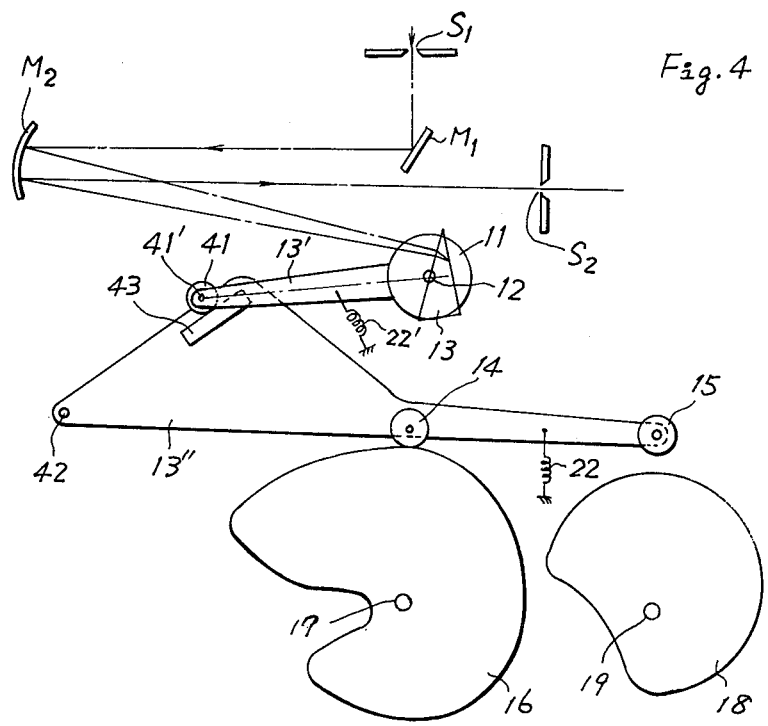
FIG. 4 is a somewhat schematic view of a third embodiment of the invention.

Turning to FIG. 4, which is directed to an arrangement for easy correction and adjustment of the deviations of dispersion of the prism from the design values. The lever 13 in FIGS. 2 and 3 is replaced by two levers 13' and 13" in FIG. 4. The lever 13' has its one end fixed to the rotatable shaft 12 of the turntable 11 and its opposite end provided with a roller 41. The lever 13" is rotatable about a pivot 42 and is provided with the two cam follower rollers 14 and 15 which alternatively engage the respective cams 16 and 18 as in the previous embodiment. The lever 13" is further provided with an engaging member 43 against which the roller 41 on the lever 13' is urged by a spring 22'.

It will be easily seen that as the lever 13" is turned about the pivot 42 with either the cam follower 14 or 15 in contact with the wavelength driving cam 16 or 18, the lever 13' is turned about the axis 12 through engagement of the roller 41 with the member 43, thereby to turn the prism 10 about the axis 12, so that a certain wavelength is obtained in accordance with the rotational angle of the cam 16 or 18.

The principle of the arrangement of FIG. 4 will now be explained with reference to FIG. 5. In the arrangement of FIG. 4 even if the length $l$ of the lever 13' (or the distance between the rotational axis 12 of the lever 13' and the rotational axis 41' of the roller) is changed, the position at which the cam follower 14 or 15 contacts the cam 16 or 18 is not changed. When the cam 16 or 18 is rotated so as to bring the engaging member 43 to a position 43' where the member 43 is in parallel with a straight line connecting the rotational axis 12 of the prism and the rotational axis 42 of the lever 13", the prism 10 does not turn even if the length $l$ of the lever 13' is changed.

Figure 5:
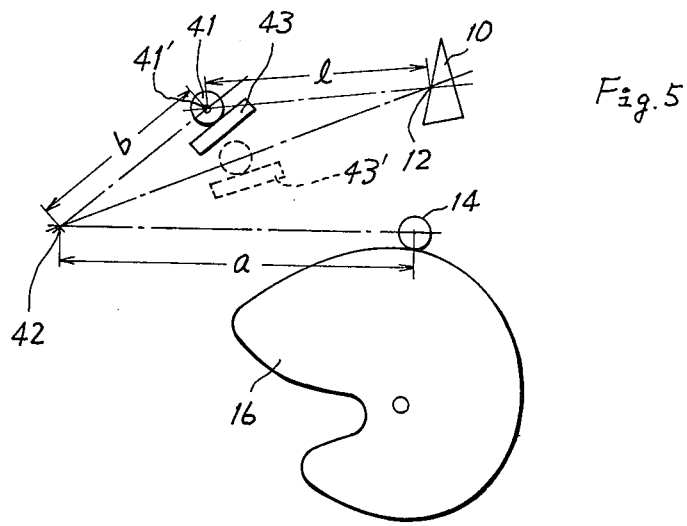
FIG. 5 is a view showing the principle of the arrangement of FIG. 4.

Under the condition that the member 43 is at the dotted line position 43' in FIG. 5, with a mercury lamp not shown but used as a light source, the angle at which the prism 10 is mounted on the turntable 11 and consequently the lever 13', the position of the wavelength selection dial relative to the wavelength driving shaft, etc, are so adjusted that a predetermined wavelength, say, 546.1 nm is actually obtained from the exit slit S2, and then the wavelength driving mechanism is operated to bring the engaging member 43 to another predetermined position, say, indicated by the real lines in FIG. 5, whereupon the length $l$ of the lever 13' (the distance between the axis 12 of rotation of the prism 10 and that 41' of the roller 41) is so adjusted that another predetermined wavelength, say, 253.7 nm is obtained. In this case, since the engaging member 43 extends aslant relative to the axial direction of the lever 13', when the distance or length $l$ is changed, the prism 10 is slightly turned about its axis 12 to provide the expected wavelength (253.7 nm) at the exit slit S2. Thereafter, when the wavelength driving mechanism is again operated to bring the engaging member 43 back to the dotted line position, the particular wavelength of 546.1 nm can be reproduced without fail.

Thus, correction over the whole wavelength range can be made by only two adjusting operations, that is, first adjusting the mounting angle of the prism to the lever 13' at a predetermined wavelength, and then adjusting the length $l$ of the lever 13' at another predetermined wavelength so that the two wavelengths expected to be obtained by the design of the mechanism can actually and accurately be obtained.

Suppose that the distance between the pivot 42 and the cam follower 14 or 15 is $a$; and the distance between the pivot 42 and the axis 41' of the roller 41 on the lever 13' is $b$. The amount of movement of the roller 41 is reduced to $b/a$ of that of the cam follower. This means that the wavelength accuracy of the device is improved by a factor of $b/a$ as compared with the case where the lever 13' is moved directly by the cam, provided that the machining accuracy of the prism and the associate elements is the same.

Figure 6:
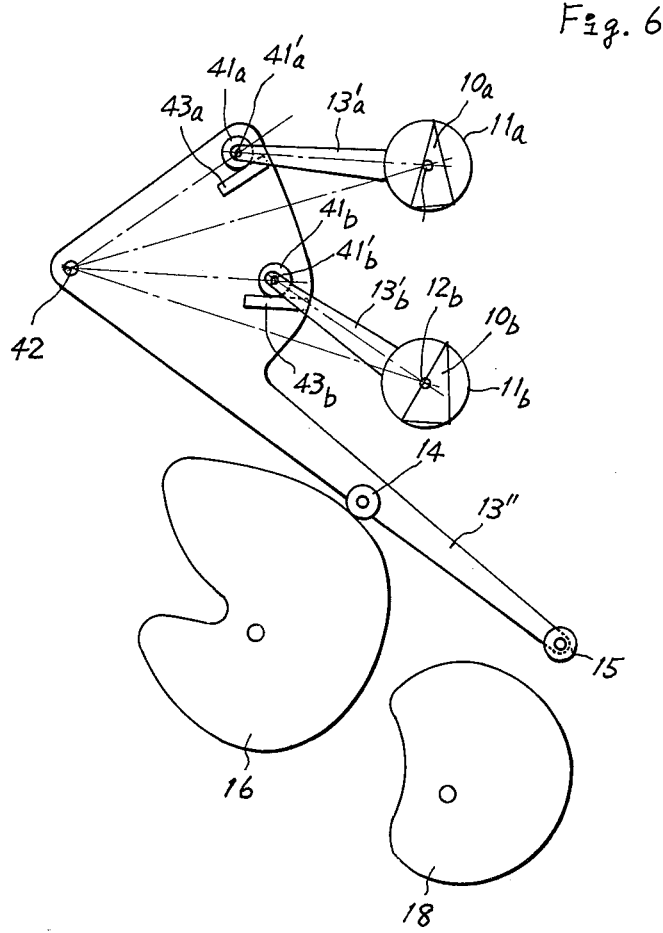
FIG. 6 is a somewhat schematic view of a fourth embodiment of the invention.

Turning to FIG. 6 which shows a modified form of FIG. 4, there are provided two prisms 10a and 10b with their respective associated elements and parts designated by the same reference numerals as those in FIG. 4 but suffixed by $a$ and $b$, respectively. The lever 13" is provided with two engaging members 43a and 43b adapted to engage the rollers 41a and 41b, respectively, for simultaneous transmission of the movement of the lever 13" to the levers 13'a and 13'b.

In order that the two prisms 10a and 10b may operate in the same manner, the prisms and their associated parts must be so arranged that a triangle defined by the straight lines connecting the pivot 42 of the lever 13", the rotational axis 12a of the prism 10a and the rotational axis 41'a of the roller 41a is congruent with a triangle defined by the straight lines connecting the pivot 42 and the axes 12b and 41'b, with the engaging members 43a and 43b making the same angle with the respective bottom sides of the two triangles. The operation of the arrangement of FIG. 6 is similar to that of FIG. 4 so that no explanation will be necessary.

In FIGS. 4 and 6, the engaging member 43 (43a, 43b) may be replaced by any other suitable means, such as a projection or recess directly formed on or in the lever 13" so as to be engaged by the roller 41 (41a, 41b).

In the illustrated embodiments, the cams 16 and 18 are mounted on their respective shafts 17 and 19. The two shafts may separately rotate about a single common axis.

The two cam followers 14 and 15 may be mounted on two separate levers for rotation of the prism 10 in FIGS. 2 and 3.

Figure 7:
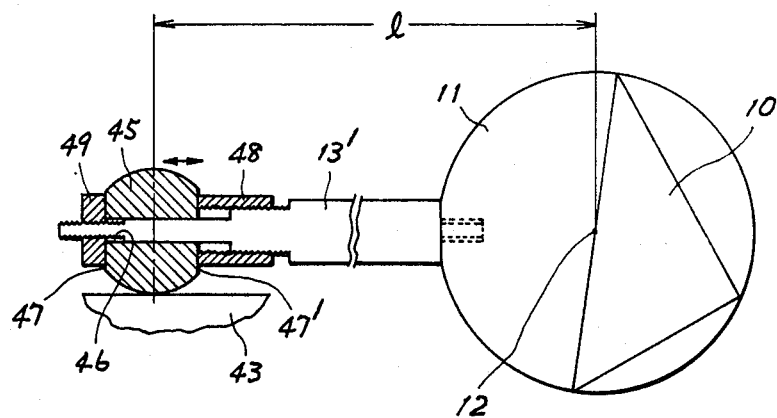
FIG. 7 is a top plan view of a portion of the embodiments of FIGS. 4 and 6.

FIG. 7 shows, by way of example, an arrangement to change the length *l* of the lever 13'. In FIG. 7 the roller 41 in FIG. 4 or 6 is replaced by a ball 45 for a higher degree of accuracy and precision.

The ball 45 has a central through bore 46 and the opposite side portions cut off to provide opposite plain faces 47 and 47'. The outer end portion of the arm 13' is inserted through the bore 46 to hold the ball 45 thereon, with a pair of nuts 48 and 49 threaded on the outer end portion of the arm 13' to hold the ball 45 therebetween. As can be easily seen, by adjusting the nuts 48 and 49 it is possible to displace the ball axially of the lever 13' thereby to change the length *l* thereof.

What we claim is:

1. A wavelength driving device for use in monochromators, comprising: means for dispersing light into different wavelengths; cam means comprising a first and a second cam; means interposed between said cam means and said dispersing means and operable in response to said cam means to operate said dispersing means so that only each predetermined one of said cams operates at one time to cause said dispersing means to provide wavelengths within a predetermined portion of the whole wavelength range covered by said dispersing means; said interposed means comprising lever means connected to said dispersing means and a first and a second cam follower mounted on said lever means; said first and second cams so contoured and mechanically connected to each other that for a predetermined angle within one revolution of said first cam said first cam follower alone is in contact with said first cam while for the remaining rotational angle of said first cam said second cam follower alone is in contact with said second cam.

2. The device of claim 1, wherein said dispersing means comprises a prism rotatable about an axis.

3. The device of claim 2, wherein said dispersing means further includes a grating and optical means for directing the dispersed light from said prism onto said grating; and said cam means further includes means for turning said grating about an axis while said prism is being turned about said axis for wavelength selection.

4. The device of claim 1, wherein said dispersing means comprises a prism rotatable about an axis; and said lever means comprise a first lever pivotable by contact with said cam means, and a second lever connected to said prism and having a point in displaceable contact with said first lever so as to be pivoted thereby to turn said prism about said axis.

5. The device of claim 4, wherein the distance between said contact point of said second lever with said first lever and said prism axis is variable.

6. The device of claim 4, wherein said first lever has an engaging member and said second lever has a roller in displaceable contact with said engaging member.

7. The device of claim 6, wherein the axial length of said second lever is variable.

8. The device of claim 4, wherein said first lever has a first and a second cam follower.

9. The device of claim 4, wherein said dispersing means further includes a grating and optical means for directing the dispersed light from said prism onto said grating; and said cam means further includes means for turning said grating about an axis while said prism is being turned about said axis for wavelength selection.

10. The device of claim 4, wherein said dispersing means further includes a second prism similar to said first prism; and said lever, means includes a third lever similar to said second lever connected to said second prism.

11. The device of claim 10, wherein the distance between said contact point of said second lever with said first lever and said first prism axis and the distance between said contact point of said third lever with said first lever and said second prism axis are variable.

12. The device of claim 10, wherein said first lever has a pair of engaging members and said second lever has a roller in displaceable contact with one of said engaging members and said third lever has a roller in displaceable contact with the other of said engaging members.

13. The device of claim 10, wherein the axial lengths of said second and third levers are individually variable.

* * * * *